Figure 1:
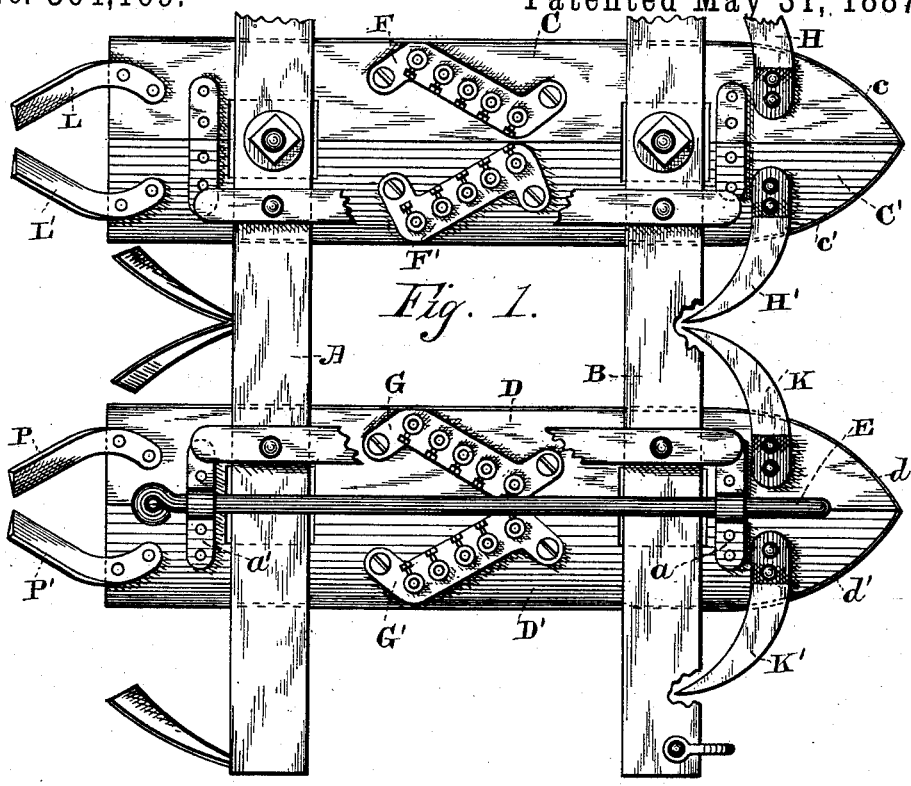

(No Model.)

C. GUENETTE.
LISTED CORN CULTIVATOR.

No. 364,169. Patented May 31, 1887.

Witnesses
John C. Miller
Percy White

Inventor
Cyprien Guenette
By his Attorney

UNITED STATES PATENT OFFICE.

CYPRIEN GUENETTE, OF CLYDE, KANSAS.

LISTED-CORN CULTIVATOR.

SPECIFICATION forming part of Letters Patent No. 364,169, dated May 31, 1887.

Application filed July 22, 1886. Serial No. 208,816. (No model.)

*To all whom it may concern:*

Be it known that I, CYPRIEN GUENETTE, a citizen of the United States, residing at Clyde, in the county of Cloud and State of Kansas, have invented certain new and useful Improvements in Listed-Corn Cultivators; and I do hereby declare the following to be a full, clear, and exact description of the invention, such as will enable others skilled in the art to which it appertains to make and use the same.

The object of this improvement is a cultivator for listed corn that will simultaneously cut the weeds between the rows, stir the soil adjacent to the plants, and move the soil toward and give the plants an upright position. These results are attained by the mechanism illustrated in the drawings herewith filed as part hereof, in which the same letters of reference denote the same parts in the different views.

Figure 2:
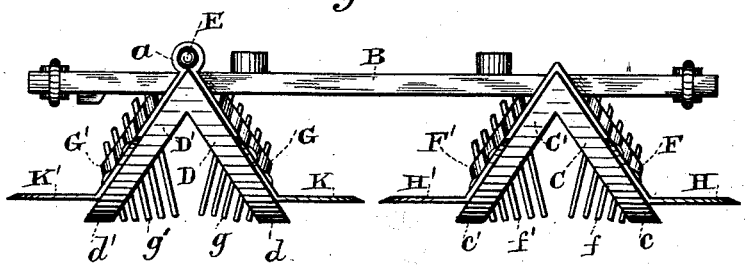

Figure 1 represents a plan view of a listed-corn cultivator embodying the features of my improvement. Fig. 2 is a front elevation of the same.

A B represent bars or beams which are let into and transversely connect two drag parts composed of plates or planks C C' and D D', secured to each other at inclinations, substantially as shown in Fig. 2, in a manner adapted to straddle the ridges of the plant-rows, for a purpose hereinafter explained. The drag parts C C' and D D' may be made of wood or metal. When made of metal, the inclined parts of which they are composed may be made integral, and when made of wood they should be provided at their lower edges with metal strips or linings $c$ $c'$ $d$ $d'$, for preventing wear of the parts by friction with the ground. The drag part C C' is rigidly secured to the transverse bars A B, and the part D D' is adjustably secured thereto by means of a rod, E, longitudinally fixed to the top of the same above the bars A B by plates $a$ $a'$, fixed to the part D D', substantially as shown, or by any suitable means.

E E' and G G' represent metal plates provided with inclined downward perforations, lateral screw-sockets, and set-screws, as shown. The plates F F' G G' are suitably secured to the drag parts C C' D D' at inclinations, as shown, and provided with pins $f$ $f'$ $g$ $g'$, which are adjustably fixed in the positions shown by the set-screws in the plates F F' G G', through which they are sufficiently extended to enter and stir the soil immediately adjacent to the growing plants and act on the latter, in a manner hereinafter explained.

H H' and K K' are weed-knives secured to each side of the parts C C' and D D' in a manner to project horizontally therefrom and transversely engage the weeds growing between the plant-rows and cut them off in the ground.

L L' and P P' are scrapers or plates secured to the parts C C' D D' adjacent to their rear ends by any suitable means, substantially as shown, and sufficiently extended and suitably inclined toward the plants between the parts C C' D D' to move the loose soil toward the same. By reason of the adjustable connection of the part D D' to the bars A B the former will automatically move outward or inward on the bars A B with the variations in the distance between the row-ridges, and will, by reason of their projection into the parts C C' and D D', hold the same to the ridges and cause the part D D' to move outward or inward, as set forth, and the parts will thereby be made to maintain their proper relative positions to the plants being cultivated. The pins $f$ $f'$ and $g$ $g'$ will simultaneously stir the soil adjacent to the plants, and when the latter are listed to one side will raise the same to an upright position, and the scrapers L L' P P' will so move the loose soil to the plants that they will be braced and held in such improved position. By reason of the pins $f$ $f'$ $g$ $g'$ being secured to the plates F F' G G' by the laterally-arranged set-screws, they may be adjusted up or down, as occasion may require, and securely held in the position best adapted to efficient operation.

Having explained the features of my improvement, what I claim as new, and desire to secure by Letters Patent, is—

In a listed-corn cultivator having double-inclined runners, as shown, the combination, with such runners, of the weed-knives arranged to transversely engage and cut the weeds between the plant-rows, the scrapers fixed to the rear end of the runners and adapted to move the soil toward and brace the position of the plants, the perforated plates fixed to the sides of the runners and provided with set-screws, and the adjustable pins for stirring the soil between the sides of the double-inclined runners, substantially as and for the purpose set forth.

In testimony whereof I affix my signature in presence of two witnesses.

CYPRIEN GUENETTE.

Witnesses:
W. H. SAVARY,
ANTHONY CARON.